Inventor
H. M. Shilstone

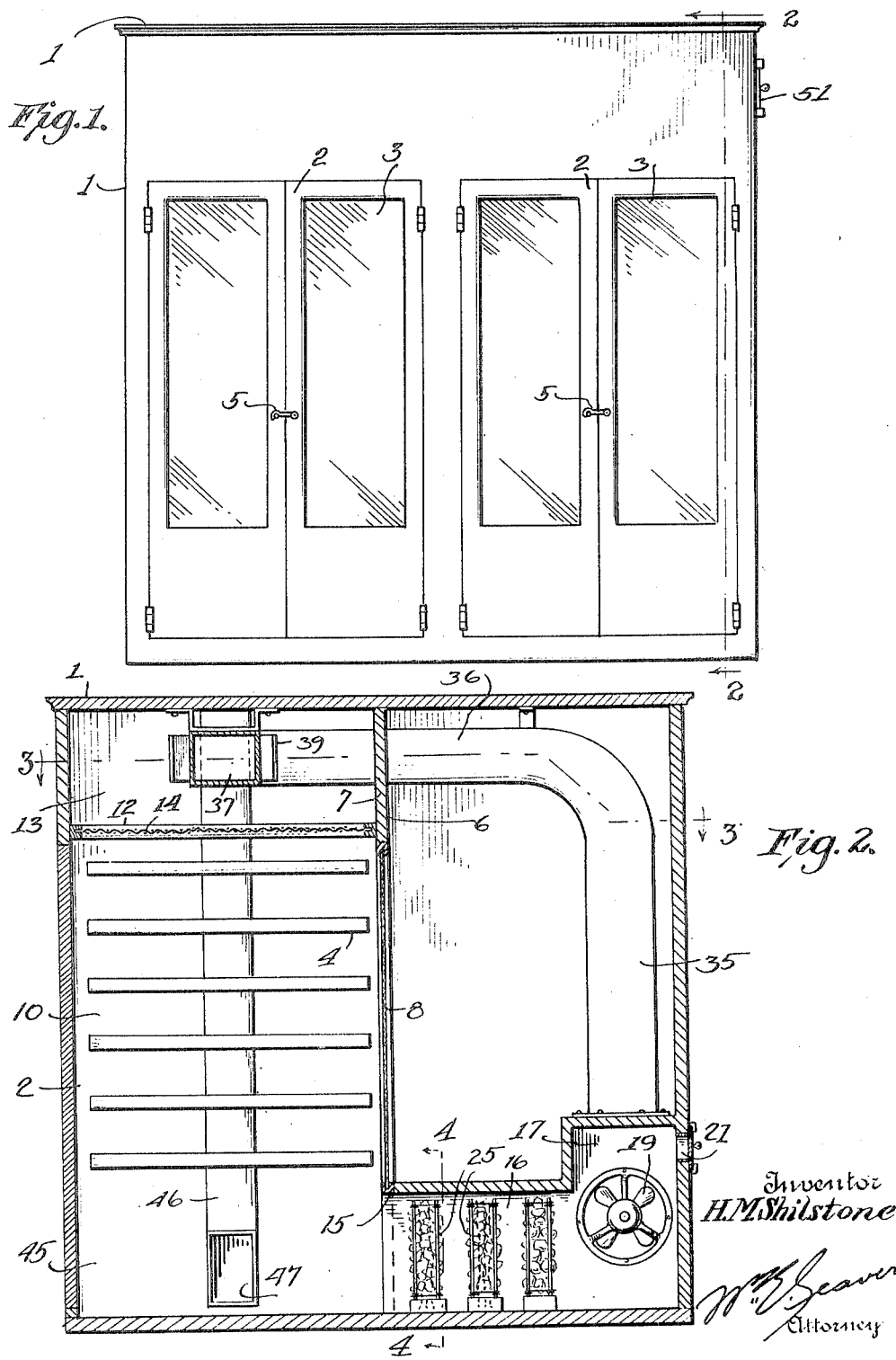

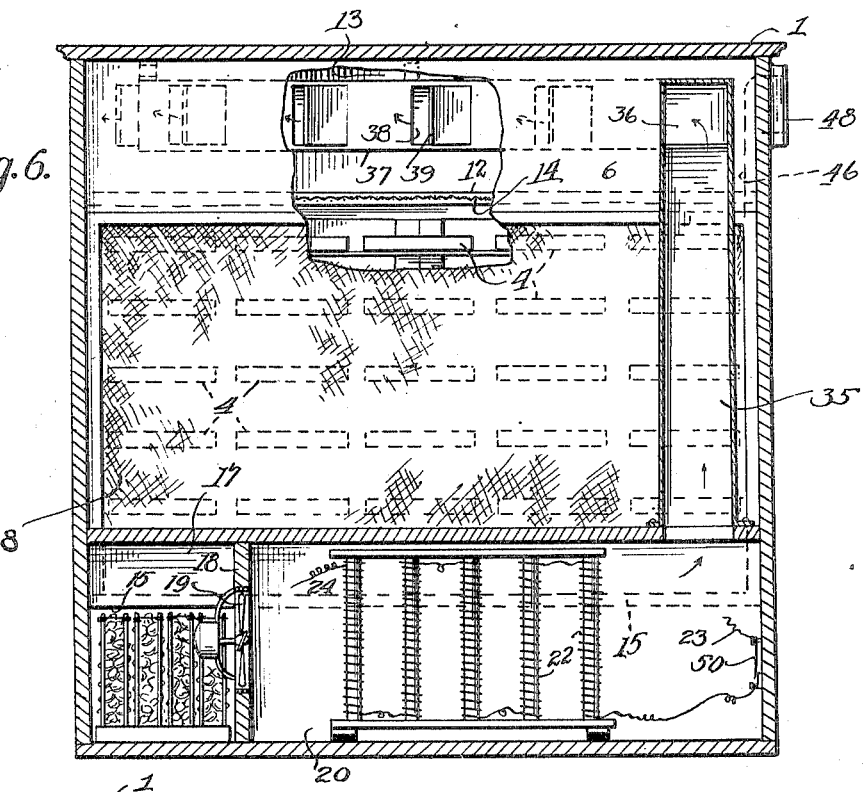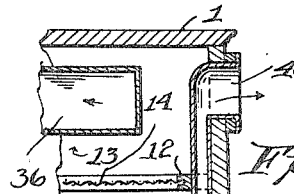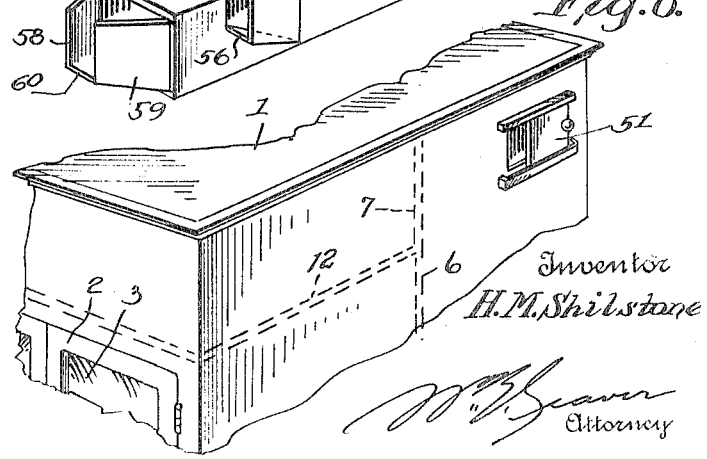

Patented July 23, 1929.

1,721,795

UNITED STATES PATENT OFFICE.

HERBERT M. SHILSTONE, OF NEW ORLEANS, LOUISIANA.

INCUBATOR AND METHOD OF HATCHING CHICKENS.

Application filed July 26, 1926. Serial No. 125,059.

This invention relates to incubators and a method for hatching chickens and has for its object to provide a construction which will be more efficient in use, and a method which will be more positive in results, than those heretofore proposed.

With these and other objects in view the invention consists in the novel details of construction and combinations of parts constituting the apparatus, and in the novel steps and combinations of steps constituting the method as will be more fully hereinafter disclosed and particularly pointed out in the claims.

Referring to the accompanying drawings forming a part of this specification in which like numerals designate like parts in all the views,—

Fig. 1 is a front elevational view of an incubator made in accordance with this invention;

Fig. 2 is a transverse sectional view taken on the line 2—2 of Fig. 1 and looking in the direction of the arrows;

Fig. 6 is a vertical sectional view taken as on the line 6—6 of Fig. 3 and looking in the direction of the arrows;

Fig. 7 is a fragmentary vertical sectional view taken as on the line 7—7 of Fig. 3 and looking in the direction of the arrows;

Fig. 8 is a fragmentary perspective view of the upper end of one side of the incubator and illustrating a temperature regulator; and Fig. 9 is a fragmentary perspective detail of a modified form of the upper end of the air conduit illustrated in the various figures.

Figure 3:
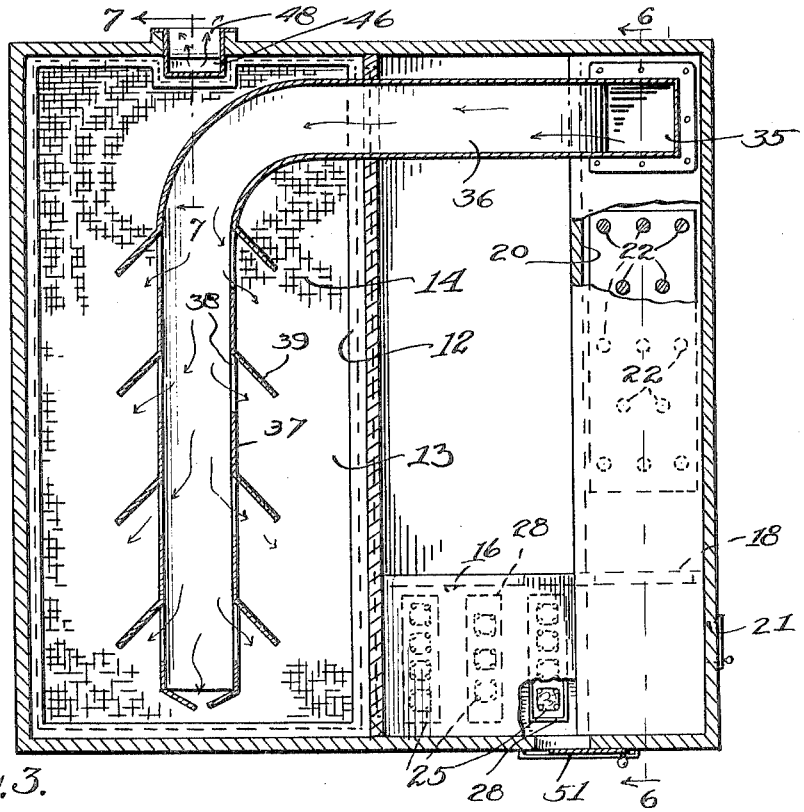
Fig. 3 is a horizontal sectional view taken on the line 3—3 of Fig. 2 and looking in the direction of the arrows.

The improved apparatus and method are designed more particularly for extensive operations where large numbers of eggs are contained in suitable trays in a retaining chamber which is properly insulated, and in which the egg compartment is maintained at a temperature suitable for incubation. The same principle, however, is applicable to any sized machine as will be readily apparent.

Heretofore it has been proposed to construct a chamber in which trays of eggs are superimposed, but said trays are not so closely connected as to prevent the free passage of heated air between and around said trays. However, this current of heated air, created by a circulating fan forcing air over suitable heating coils, is not fresh but consists largely of air which has already been passed over the eggs. Further, the usual and well known prior methods provide for the passage of the freshly heated air in an upward direction and over, around and by the trays of eggs, the eggs being particularly arranged in the machine in relation to the period over which they have been in contact with the heated air. That is to say, as the incubation proceeds the eggs are transferred to lower levels in the machine, preferably at seven day intervals.

The intent, purpose and condition as claimed in these prior processes by such treatment is, that air which has been heated to a suitable temperature in a heating chamber adjoining the egg compartment is forced in a downward direction and passes under the bottom of the partition common to the heating chamber and the egg compartment and rises around and through the trays, which are arranged in racks in four stages of incubation, i. e., at the bottom eggs which are hatching chickens, next above eggs which have been in the incubator fourteen days or more, next above eggs which have been in the incubator from seven to fourteen days, and at the top eggs which have been in the incubator from one to seven days.

The advantages offered for this prior process of incubation is that in addition to conserving the moisture, the units of heat given off from the eggs will be carried from the eggs in the more advanced stage of incubation to those in a less advanced stage. It is further claimed that a portion of the heated air, blown through the heating chamber and around the eggs in an upward direction, is partly reused without any treatment by suction through openings connecting the egg compartment with the circulating fans. The quantity of air lost by exit through the openings above the egg chamber is replaced by an intake of fresh air through openings directly over the suction fans.

However, in actual practice this prior process of incubation is far from perfect. Where, under ideal conditions of egg fertility, the percentage of hatch of eggs from healthy stock may be high, certain physical conditions, however, exist in the egg chamber which tend to lower the vitality of the developing germ and a great number are therefore destroyed in the process of incubation. It is a well known fact that eggs, in the process of incubation, absorb oxygen and give off carbon dioxide and sulphuretted hydrogen, the oxygen being necessary to sustain the life of the germ. The carbon dioxide and sulphuretted hydrogen both being poisonous gases must be removed promptly to prevent a destruction of the hatch. These facts make it essential that, in artificial incubation of eggs for ideal conditions, there must be present an atmosphere which carries a maximum amount of oxygen and a minimum amount of poisonous gases. Any process by which the weak germ is subject to atmospheres of carbon dioxide and sulphuretted hydrogen is more or less imperfect, directly in proportion to the volume of these gases present. Further, by any process in which heated air is forced in an upward direction in such a manner as to only carry a pressure great enough to diffuse said heat, these gases will accumulate by virtue of their greater specific gravity than pure air, and it will require an excessive pressure or draft from below to force these heavier gases through the upper strata of lighter air. In fact the actual condition of the atmosphere in such an egg compartment will not be one of diffusion but will actually be a condition of forced draft, which reacts detrimentally in incubation, as it causes large volumes of air to be passed around the eggs. By such a treatment, the eggs are highly desiccated through their loss of moisture to the adjacent moving atmosphere of heated air.

In carrying out this invention, there is provided a cabinet 1 provided on its front side with a plurality of doors 2 which may have panels of glass 3 therein in order that the condition of the eggs carried by the trays 4 may be the better watched. The doors 2 are adapted to tightly fit the openings therefor and may be held in locked closed position by any suitable means such as the catch 5. The cabinet 1 is preferably constructed of any suitable material which will be heat insulating, and at about its middle there is provided a transverse partition 6 the upper part 7 of which is solid, but the lower portion of which need not be absolutely air tight, and to this end it has been found that a partition made of heavy fabric, as indicated at 8 in Fig. 2, is well suited for the purpose. The partition 6 divides the chamber into two portions, the front compartment 10 being for the egg trays 4, and the other portion of the chamber having disposed therein the air purifiers, the exhaust fan, and the heating elements, presently to be described.

The egg trays 4 may be arranged in any suitable formation irrespective of the period of incubation, but it has been found preferable to have the said trays superposed or arranged in spaced vertical tiers, as shown in Figures 2 and 6 the uppermost trays containing eggs requiring longest incubation and the lowermost trays containing eggs requiring least incubation. There may be any number of trays, and they may be arranged in a plurality of vertical units as particularly illustrated in Fig. 6, the arrangements of the trays being determined by the size of the incubator chamber and other constructive details. The trays may be equipped with any suitable mechanism, not shown however, by which the trays are tilted in order to change the position of the eggs at periodical intervals, and which mechanism can be operated from any convenient position. That is to say, the particular means for changing the position of the trays does not form a part of this invention and therefore no means has been shown.

Near the top of the egg tray compartment 10 there is provided a partition 12 to create a pressure chamber 13 thereabove, and it has been found that a partition made of reticulate material, such as wire screening 14 of fourteen, sixteen or eighteen mesh, is well suited for this purpose. The purpose of this pressure chamber is to insure a larger volume of air coming into it from the heating chamber than can be possibly discharged through the apertures of the reticulate partition 12. It is to be understood, however, that wire mesh is not the only material that can be used for this partition 12, as any porous partition can be used which will create a higher pressure above said partition than there exists below said partition. From such a construction it will be obvious that the pressure of the heated air will be built up in the pressure chamber 13, thereby creating a uniform temperature therein and released therefrom through the apertures of the partition 12 in such manner as to prevent any undesirable drafts occurring in the egg tray compartment 10, with the result that the compartment 10 will have a more uniform temperature than would be the case were the partition not employed.

With particular reference to Figs. 2, 3 and 6 it will be seen that at the floor level of the chamber 1, and at one side thereof, there is provided an opening 15 in the mid-partition 8 from which leads the enclosed passage 16 to the chamber 17 having an end wall 18 provided with an aperture within which is closely fitted an exhaust fan 19 which may be rotated by an electric motor, or any other suitable power, said fan adapted to exhaust the air from the egg compartment 10 and to supply air under pressure to the heating chamber 20. A suitable aperture 21 is provided in the fan chamber 17 through which fresh air may be drawn into the incubator. This aperture may be provided with any means for regulating the amount of air admitted therethrough.

The heating chamber 20 lies substantially at right angles to the conduit 16 leading to the fan chamber 17, and has disposed therein any means for heating the air, such as a plurality of electric heating coils 22 receiving current from a suitable source not shown, over the wires 23 and 24. As best illustrated in Fig. 3 these heating coils are preferably staggered so as to better heat the air passing through the chamber 20.

The air withdrawn from the egg tray compartment 10 by the fan 19, will pass over and through a plurality of purifying cells generally indicated by the numeral 25 which are disposed in the passage 16. These cells are for removing the poisonous gases accumulated in the process of incubation as well as for collecting practically all of the fluff which gathers from the hatching chickens, which is a most important step in the process of hygienically hatching chickens. That is to say, it is a well known fact that infection is carried from diseased parent stock to the incubated chicken through the medium of the egg, and as it is impossible to always select absolutely healthy stock for egg production to be used in commercial incubation, infection of the healthy stock frequently occurs by the movement of this fluff in the process of incubation.

Figures 4, 5:
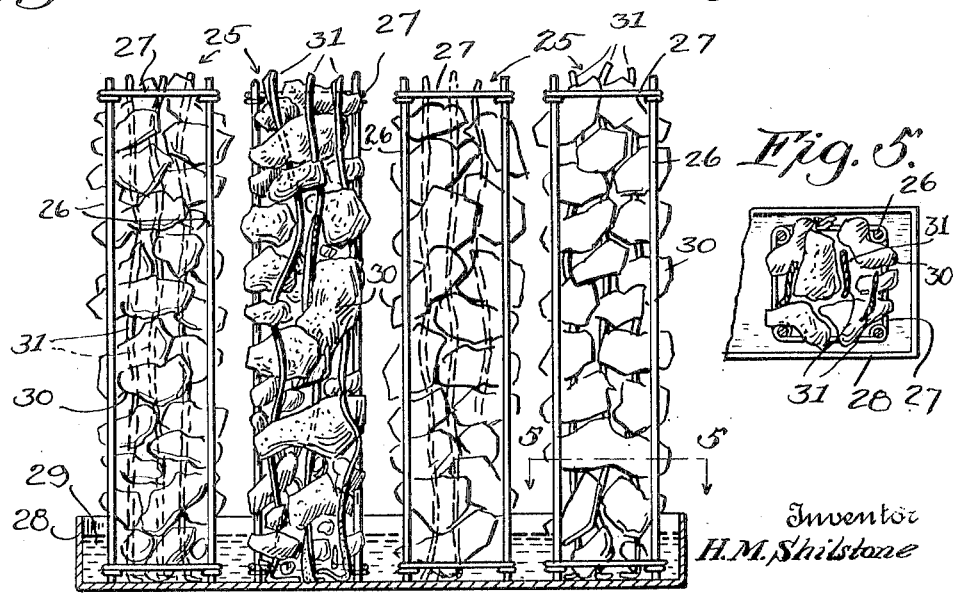
Fig. 4 is an enlarged detail sectional view of the air purifying apparatus taken on the line 4—4 of Fig. 2 and looking in the direction of the arrows.
Fig. 5 is a horizontal sectional view taken as on the line 5—5 of Fig. 4 and looking in the direction of the arrows.

With particular reference to Figs. 4 and 5 it is to be observed that these cells comprise cages preferably made of vertical rods 26 suitably bound together as by tie wires or other suitable means 27 at the top and bottom thereof. A plurality of these cages are adapted to be stood on end as clearly seen in the drawings, in a tray 28 adapted to contain a suitable chemical solution 29 which will absorb carbon dioxide and sulphuretted hydrogen, as for example a solution of caustic alkali, or calcium hydroxide in its natural form may be used. In order that this chemical solution may act better on the air in the passage 16, the cages above referred to are filled with any suitable porous material 30, such for example as coke, and in order that said porous material may receive the chemical solution, there are provided suitable capillary channels 31, such as strands of fibrous material, threaded vertically through said porous material. These cells 25 are preferably spaced in staggered relation in the passage 16 to substantially cover the cross sectional area of the same, with the result that practically all of the air will be affected by these purifying cells. It is to be observed that the fresh air inlet 21 to the fan chamber 17 is disposed between the purifying cells 25 and the fan 19.

The air from the heating chamber 20, see Fig. 6, passes upwardly in the direction of the arrows through the vertical passage 35, thence into and through a horizontally disposed conduit 36 passing through the upper solid portion 7 of the mid-partition 6 of the incubator, and then into a conduit 37 extending longitudinally of the pressure chamber 13 and disposed midway thereof. In the end and side portions of the conduit 37 are disposed a plurality of ports or openings 38 provided with deflectors 39, through which the heated air may pass into the pressure chamber 13, all as will be clear from the drawings.

From the foregoing, it will thus be seen that the fan 19 creates a low pressure on the intake side thereof which causes the heated air under pressure in the pressure chamber 13 to pass through the partition 12 into the egg compartment 10 where it will circulate through and around the trays 4 picking up the poisonous gases and fluff and conveying them to and over the purifying cells 25. The purified air is then forced by the fan 10 over the heating coils 22, thence through the conduits 35, 36 and 37, through the ports 38, into the pressure chamber 13 from which it will escape by passing through the partition 12 due to the reduced pressure on the underside thereof. Thus the cycle is established.

It is to be observed that by this invention the conditions are such that a relatively small fan will produce perfect results by the circulation of pure air, in contradistinction to the large volumes of heated air circulated over the eggs by the use of several fans found necessary in prior processes. In fact it has been found that in the operation of an incubator for sixty-five hundred eggs, perfect results have been obtained by the use of a twelve inch electric exhaust fan, whereas any similar capacity machine of well known construction, has required three high speed sixteen inch electric fans to create sufficient fresh atmosphere to properly incubate a similar number of eggs.

At the bottom of the compartment 10 there is provided a space 45 of considerable size beneath the lowermost egg tray 4. This space or bottom compartment receives all the used air and the poisonous gases which are given off by the eggs and chicks and, as will be readily seen from Fig. 2, this compartment 45 connects with the purifying chamber 16. Thus it will be seen that the poisonous gases and fluff which settle to the bottom of the compartment 10 will be withdrawn therefrom without affecting in any way the purified and heated air admitted at the top of said compartment 10.

In order to provide for the removal of surplus heated gases, containing these obnoxious and poisonous gases from the compartment under the eggs, there is provided a conduit 46 having the opening 47 in the bottom thereof and disposed at the floor level of the compartment 10. This conduit 46 extends upwardly within the said compartment to the top of the cabinet 1, where it is in open communication, as at 48, with the atmosphere surrounding the said cabinet. This outlet 48 may, however, be at any point above the level of the eggs in the compartment 10. The purpose of this conduit 46 is to retain, as far as possible, diffused air under pressure in the egg compartment and by this process to completely eliminate air pockets and strata not in motion as a whole.

To control the heat in the incubator there may be provided any suitable means, such as the thermostat generally indicated by the numeral 50 in Fig. 6, located in the heating chamber 20. Obviously any other suitable means may be employed, and further there may be auxiliary devices to the thermostat 50 such as openings in one of the side walls of the chamber 1 controlled as by the slide 51.

In the modified form of air conduit 37 shown in Fig. 9 it is to be observed that the deflector plates 55 have their lowermost portions inturned to provide inclined shelves 56 adapted to coact with the ports or openings 57 so that the air emitted from said conduit will be given a slight upward movement, as will be readily apparent from said figure. In like manner the deflector plates 58 and 59 disposed at the end of the conduit 37 have associated therewith a shelf 60 which, too, is inclined out of the plane of the bottom of the conduit so that air passing between said deflector plates will likewise be given an upward movement.

From the foregoing it will therefore be seen that by this construction there is provided an incubator having an egg compartment 10, a heating chamber 20 and means to discharge foul air from the bottom of said compartment 10 which is the passage 46, with the lower opening 47 and the upper opening 48 communicating with the atmosphere outside of the cabinet at a level above the uppermost tray 4. Further there is provided means including a purifying chamber 16 and an air inlet 21 to supply pure moist air to the heating chamber 20 from both inside and outside of the incubator to replace the foul air discharged through the conduit 46. In other words, the cells 25 obstruct the air withdrawn from the egg compartment 10 and passing through the passage 16, and the chemical solution associated with said cells purifies by absorption the air charged with poisonous gases and other impurities which are highly objectionable as well as detrimental to incubation. The opening 21 allows fresh air from outside the cabinet to be drawn therein, and this air has the sufficient moisture content to replace the air discharged from the egg tray compartment 10. Lastly there is provided means comprising the perforated partition 12 to increase the pressure of the heated air before entering the egg compartment 10 whereby the temperature of said compartment is made more uniform. The thermostat illustrated at 50 constitutes the automatic means to regulate the temperature of the heating chamber 20 and the partition 12 provides the pressure chamber 13 above the egg compartment 10, so that the circulation of air through the incubator is in a downward direction or in other words, in the direction of the progressive stages of incubation.

It is obvious that those skilled in the art may vary the details of construction as well as the arrangements of parts and may also vary the steps of the process, without departing from the spirit of this invention and therefore it is not desired to be limited to the foregoing except as may be demanded by the claims.

What is claimed is:

1. An incubator having an egg compartment and provided with an air purifying chamber through which all the air from said compartment to be reused must pass, said chamber being provided thereacross with chemical means serving both to absorb poisonous and objectionable gases and to collect infectious fluff.

2. An incubator, provided with means to create a pressure and an exhaust as well as means to heat the circulated air therein, said incubator further having a compartment provided with a plurality of superimposed egg trays and a chamber below the lowermost, provided with means to remove the poisonous gases in the air therein, said means including a plurality of outlets from said chamber one of which communicates with a purifying chamber through which passes the heated air exhausted from said compartment, and another of which communicates with the outside atmosphere while substantially maintaining the pressure in said compartment, and means to convey the heated purified air to said trays.

3. The method of incubating a plurality of eggs arranged in trays at different levels in a single compartment, the uppermost tray requiring longest incubation and the lowermost tray the least incubation, which consists in causing air to circulate through said compartment in a direction toward the more advanced stage of incubation; discharging a portion of the foul air from the bottom of said compartment; heating the circulated air; causing the heated air to enter the top of said compartment under pressure to maintain a uniform temperature therein; removing the poisonous gases and other impurities in the air while it is being circulated whereby the purified air is again passed around the eggs; and maintaining the moisture content of said air by natural means.

4. In an incubator the combination of an egg compartment provided with a plurality of trays; a heating chamber; means to circulate air between said compartment and said chamber; means to supply air to said heating chamber, said means including a passage between said compartment and said chamber provided with a valved opening in an outer wall and crossed by air purifying elements to intercept substantially all the air passing through said passage from said compartment said opening for admitting outside air to said passage at a point between said elements and said chamber whereby the oxygen content of the air is increased before entering said chamber; and means to increase the pressure of the heated air entering said compartment to force said air through all of said trays.

In testimony whereof I affix my signature.

HERBERT M. SHILSTONE.